United States Patent
Kronseder

(10) Patent No.: US 6,533,345 B2
(45) Date of Patent: Mar. 18, 2003

(54) MAIN BEARING UNIT FOR A CONVERTIBLE FOLDING TOP

(75) Inventor: Robert Kronseder, Hohenpolding (DE)

(73) Assignee: Edscha Cabrio-Verdecksysteme GmbH, Hengersberg (DE)

( * ) Notice: Subject to any disclaimer, the term of this patent is extended or adjusted under 35 U.S.C. 154(b) by 0 days.

(21) Appl. No.: 09/912,907

(22) Filed: Jul. 26, 2001

(65) Prior Publication Data

US 2002/0014784 A1 Feb. 7, 2002

(30) Foreign Application Priority Data

Jul. 28, 2000 (DE) .......................................... 100 36 922

(51) Int. Cl.$^7$ .............................................. B60J 7/057
(52) U.S. Cl. .................. 296/117; 296/107.01; 296/112; 296/121; 296/115
(58) Field of Search ................. 296/117, 121, 296/107.01, 112, 115

(56) References Cited

U.S. PATENT DOCUMENTS 5,067,768 A  * 11/1991 Fischbach .................... 296/107
5,620,226 A  * 4/1997 Sautter, Jr. .................... 296/107
5,645,309 A    7/1997 Graf
5,671,966 A  * 9/1997 Busch ........................... 296/107
5,772,274 A  * 6/1998 Tokarz ...................... 296/107.01
5,785,375 A  * 7/1998 Alexander et al. ........... 296/108
5,967,590 A  * 10/1999 Beierl et al. ............. 296/107.01

FOREIGN PATENT DOCUMENTS

DE          9108834      1/1992
DE          4423834      11/1995
DE          9419391      5/1996

* cited by examiner

Primary Examiner—D. Glenn Dayoan
Assistant Examiner—Gregory A Blankenship
(74) Attorney, Agent, or Firm—Davidson, Davidson & Kappel, LLC

(57) ABSTRACT

The invention relates to a main bearing unit for a convertible folding top, comprising a bearing plate, at least one kinematic pivot point of a folding-top linkage of the convertible folding top, which kinematic pivot point is mounted pivotably in the bearing plate, a linear force-introducing unit, a pin which is assigned to the folding-top linkage, wherein the linear force-introducing unit, in order to actuate the folding-top linkage, is in driving connection with the pin assigned to the folding-top linkage, and a hole in the bearing plate, wherein the force-introducing unit is held in the hole in the bearing plate and is integrated in the bearing plate.

14 Claims, 1 Drawing Sheet

MAIN BEARING UNIT FOR A CONVERTIBLE FOLDING TOP

FIELD OF THE INVENTION

The invention relates to a main bearing unit for a convertible folding top, having a bearing plate in which at least one kinematic pivot point of a folding-top linkage of the convertible folding top is mounted pivotably, wherein, in order to actuate the folding-top linkage, a force-introducing unit is in driving connection with a pin assigned to the folding-top linkage.

DESCRIPTION OF THE PRIOR ART

Convertible folding tops are known in practice in which the folding top can be opened and taken down again by means of a folding-top linkage, the folding-top linkage being mounted pivotably in a bearing plate which is fixed on the body work, with force-introducing units, for example a spring for a manually actuated folding top or a hydraulic piston-cylinder unit for a folding top which can be taken down automatically, being provided in order to transmit forces during actuation of the folding-top linkage. The force-introducing unit generally engages here on a part outside the kinematic pivot points of the linkage, as a result of which favorable lever ratios can be obtained. However, one disadvantage of the known convertible folding tops is the large structural space which is required when the main bearing and force-introducing units have to be provided next to each other, in which case both parts require a certain minimum wall thickness. Furthermore, this causes a considerable weight to accumulate, the pivoting space, moreover, being yet further restricted by the circumstance that hydraulic cylinders, at least, are likewise supported on the bearing plate for reasons to do with strength. This is problematical in particular because the folding-top kinematic arrangement generally comprises at least one driven multijointed linkage, in which the linkages have already to be designed such that they can pivot past one another, and this means that the structural space is only available outside the pivoting region. As a result, the region of the linkages is often difficult to access and complicated to clean and to maintain.

DE 94 19 391 U1 describes a driving device for a convertible folding top, in which a main pillar and a stirrup are mounted in a pivoting manner on a console, an electric motor having a step-down gear for driving the main pillar and stirrup likewise being secured on the console.

DE 91 08 834 U1 describes a driving device for a soft top, in which a main bow, a stirrup and other linkage parts are coupled to a console. Furthermore, a compression cylinder is connected movably to the console via a tilting lever and one end of a piston rod of the compression cylinder is mounted in an articulated manner on one of the linkage parts.

DE 44 23 834 C1 describes a driving device for a retractable soft roof, in which the folding-top linkage parts which are to be driven are held pivotably on a console secured on the vehicle bodywork. A driving cylinder is secured by one end in an articulated manner on the bodywork and is connected by one end of its piston rod in an articulated manner to one of the linkage parts.

SUMMARY OF THE INVENTION

The object of the invention is to provide a main bearing unit which is of compact and lightweight design.

According to the invention, this object is achieved by a main bearing unit for a convertible folding top, comprising a bearing plate, at least one kinematic pivot point of a folding-top linkage of the convertible folding top, which kinematic pivot point is mounted pivotably in the bearing plate, a linear force-introducing unit, a pin which is assigned to the folding-top linkage, wherein the linear force-introducing unit, in order to actuate the folding-top linkage, is in driving connection with the pin assigned to the folding-top linkage, and a hole in the bearing plate, wherein the force-introducing unit is held in the hole in the bearing plate and is integrated in the bearing plate.

The main bearing unit according to the invention makes it possible to restrict the requirement for structural space for the provision of the force-introducing unit to the requirement for structural space for the bearing plate, and thereby to provide a clearer arrangement of the folding-top kinematic arrangement as well as a narrower arrangement. At the same time, the weight of the main bearing unit is correspondingly reduced and the multiplicity of parts to be supplied is reduced. Also, the outlay on installation is smaller, since, in particular, the force-introducing unit no longer has to be mounted on the bearing plate with a pivoting option, as a result of which the main bearing unit can be produced cost-effectively.

The force-introducing unit preferably comprises an axially displaceable shank or piston which is in driving connection with the pin. In this regard, it is possible to design the shank in the manner of a rack whose displacement causes a rotational movement of the circumferentially toothed pin and vice versa. By this means, an axial introduction of force can be converted into the pivoting movement of the folding-top linkage and the folding top can thereby be actuated. It is possible to convert the driving connection via a gear or the like; it is furthermore possible to connect the shank to a further pin of the folding-top kinematic arrangement, for example in order to synchronize a second drive in this manner, for example for a folding-top compartment lid or for a separate folding-top part, in which case, as an alternative, the synchronization can take place via a common gear or control link. The pin is itself again held in an optionally pivotable manner in part of the folding-top linkage.

The force-introducing unit, in order to actuate the folding-top linkage, is preferably in driving connection with the pin in the kinematic pivot point.

As an alternative to the connection to the pin in the kinematic pivot point, it is possible to allow the shank or a part connected to the shank to emerge on one side from the bearing plate and then to be connected to a linkage joint provided outside the pin and to introduce the folding-top movement. The part which is connected to the shank may also be a chain or a cable which is guided, for example, via a deflection pulley and can correspondingly transmit tensioning movements.

However, the driving connection between the pin and the force-introducing unit is preferably enclosed by the bearing plate, so that contaminations of the driving connection, which might make the drive more sluggish, are advantageously avoided. At the same time, this is also a visually attractive covering of a gear of the folding-top drive, said covering fitting in particularly well with the driving comfort and the esthetics of a convertible vehicle.

In the simplest case, the force-introducing unit for a manually actuated convertible folding top can comprise a spring element which primarily serves for the weight counterbalance and the relaxing or tensioning of which takes place by the displacement of a rack by the manual actuating of the folding top, it being possible for the spring element to be designed both as a mechanical helical spring and as a throttle in a hydraulic or pneumatic system. However, the force-introducing unit preferably comprises a hydraulic piston-cylinder unit whose piston rod enables the convertible folding top to be driven by a spindle and spindle nut system or by a rack and pinion system. In this connection, a cylindrical hole in the bearing plate is advantageously provided as the guiding surface for the piston, the said hole taking over the guiding task of the cylinder and, at the same time, being secured in a positionally fixed manner in the bearing plate. The cylindrical hole is closed to the outside via a stopper, for example, and furthermore has at least one connection for a hydraulic line, which connection can lead either axially or radially into the cylinder hole.

The main bearing unit is preferably produced as an extruded profile or as a cast part, and furthermore has apertures in order to fasten the bearing plate to the bodywork. For reasons to do with weight and for better provision of the kinematic pivot points, the bearing plate is preferably of hollow design with two opposite side walls.

The hole for the force-introducing unit is preferably arranged essentially parallel to the main direction of extent of the main bearing unit, so that the elongated constructional shape of the bearing plate can be used favorably and, at the same time, there remains a sufficiently long cavity in which the shank or the piston rod can be displaced. Care should be taken here to ensure that the cylinder hole for the force-introducing unit is arranged as far as possible outside the bearing for the folding-top kinematic arrangement and further parts of the convertible folding top and/or parts interacting with the folding top, so that the bearing-plate height which is required in any case is used favorably.

A first kinematic pivot point is preferably situated on one side of the force-introducing unit and a second kinematic pivot point of the folding-top linkage is preferably situated on the other side of the force-introducing unit. The main bearing unit is expediently arranged so that its main axis is vertical, but it can take up any desired position.

Further advantages and features of the invention emerge from the following description and from the dependent claims.

The invention is explained in greater detail below with reference to a preferred exemplary embodiment and by referring to the attached drawings, in which:

DETAILED DESCRIPTION OF A PREFERRED EMBODIMENT

Figure 1:
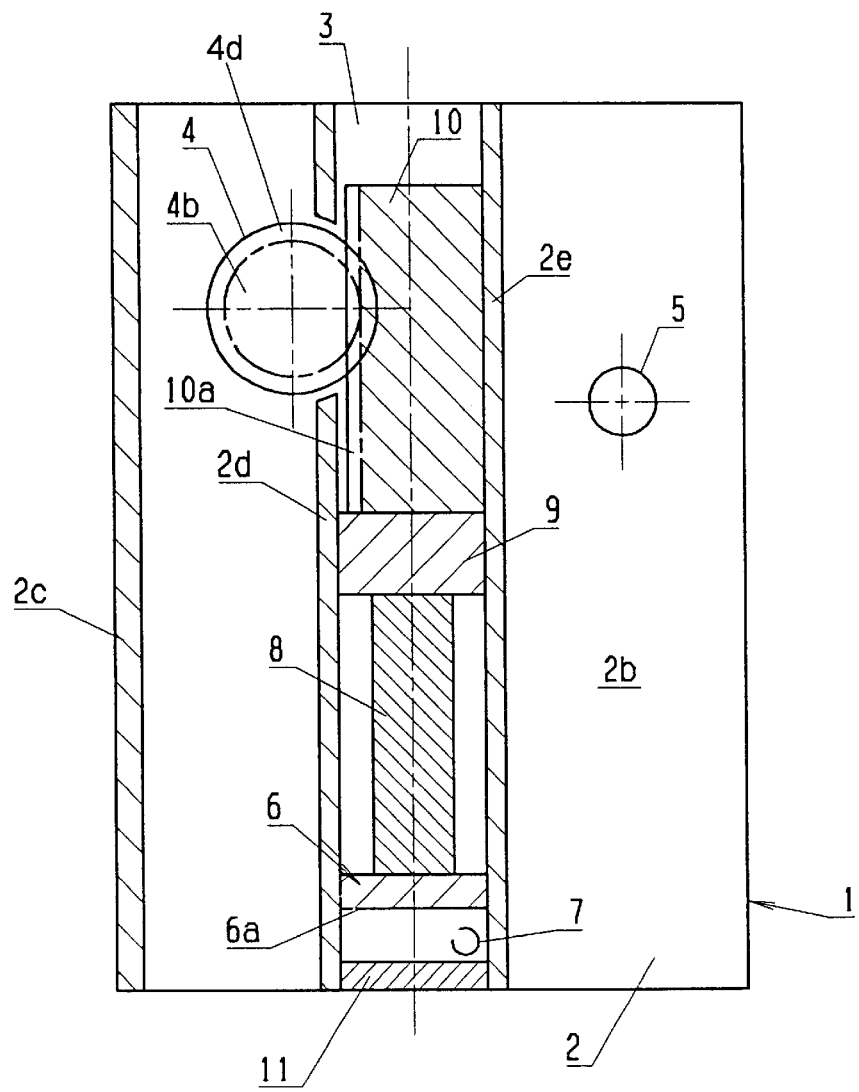
FIG. 1 shows a longitudinal section through a preferred exemplary embodiment of a main bearing unit according to the invention.
Figure 2:
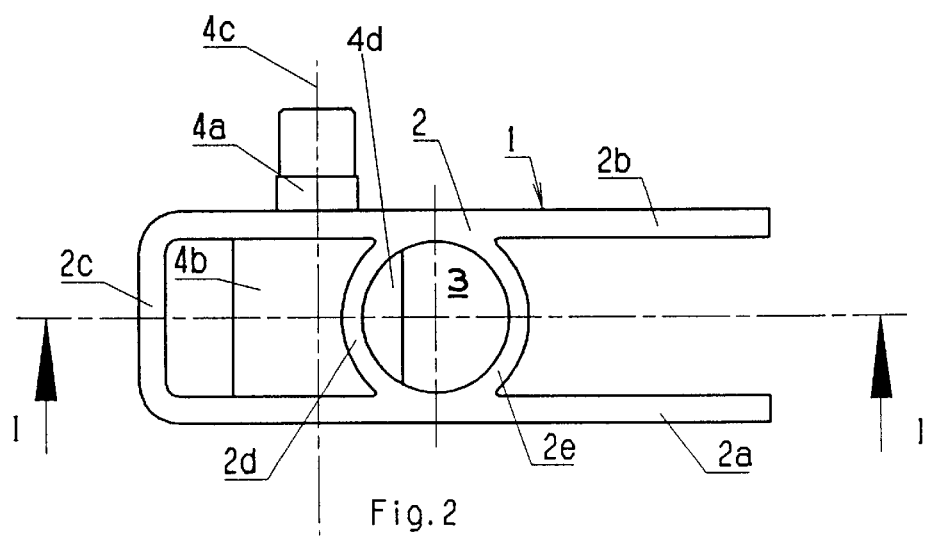
FIG. 2 shows an end-sided view of the main bearing unit from FIG. 1.

In FIGS. 1 and 2, 1 denotes a main bearing unit which essentially comprises a bearing plate 2 which can be fastened laterally to a motor vehicle's bodywork by means (not illustrated). As can be seen in more detail in FIG. 2, the bearing plate 2 is designed as a hollow profile and has an essentially rectangular cross section. The bearing plate 2 comprises two side walls 2a, 2b which are arranged essentially parallel and are designed in the manner of an inverted U having downwardly pointing legs and a base 2c which connects the legs 2a, 2b, two additional webs 2d, 2e also being provided in the inner region, said webs making possible the formation of a cylindrical hole 3 which passes longitudinally through the bearing plate 2.

In the wall 2b of the bearing plate 2, which wall faces the center of the vehicle, two holes are provided as kinematic pivot points 4, 5 of a folding-top linkage, of which only a pin 4a is illustrated here. The two kinematic pivot points 4 and 5 are realized by cylindrical holes in the wall 2b of the bearing plate 2, said holes holding pins which are assigned to the folding-top linkage and which there, in the manner of a multijointed gear, permit a pivoting movement of the linkage for opening and taking down the folding top. While the kinematic pivot point 5 permits free rotation, the pin 4a is of integral design with a pinion section 4b, the two parts having a common axis 4c, the axis 4c being mounted transversely with respect to the hole 3, approximately level with the apex of the web 2d, which is in the form of a segment of a circle, so that a circumferentially toothed part 4d of the pinion 4b projects into the hole 3. The pin 4a is connected in a rotationally fixed manner to a link (not illustrated) of the folding-top linkage, which link converts the rotational movement of the pin 4a and of the pinion 4b in the kinematic pivot point 4 into a pivoting movement of the folding top.

The cylindrical hole 3 defines an inner cylinder for a piston 6 which is designed in the shape of a disk and can be displaced axially in the hole 3. On its large piston surface 6a, the piston 6 is subjected to a hydraulic fluid, such as oil, which can be admitted via an inlet 7 to which a hydraulic line is connected, in order to displace the piston 6 forward, or the piston can be pulled back again by a further inlet (not illustrated) acting upon the other piston surface of the piston 6. A hydraulic space in the hole 3, which space faces the piston surface 6a, is closed on the end side by a lid 11 in order to prevent the emergence of hydraulic fluid.

On the surface which faces the surface 6a of the piston 6, a piston rod 8 is connected centrally to the piston 6 and the end of said piston rod which faces away from the piston 6 penetrates a guiding element 9 which is likewise supported against the cylindrical inner wall of the hole 3. It is likewise possible to subject the intermediate space between the piston 6 and the guiding element 9 to hydraulic fluid in order to act upon the piston 6 on both sides. The guiding element 9 is provided with a central hole through which the piston rod 8 can pass, this bushing being sealed in such a manner that hydraulic fluid losses do not occur in the event of hydraulic fluid being provided between the piston 6 and the guiding element 9.

On the side of the guiding element 9 which faces away from the piston 6, the piston rod 8 is connected to a sliding element 10 which is designed in the manner of a rack, the sliding element 10 being designed as a cylinder segment which is matched to the cross section of the hole 3 and whose upper region is cut off, in which case the cutting plane has a toothing 10a.

The toothing 10a meshes with the circumferential toothing 4d of the pinion 4b, so that when the piston 6 is displaced by hydraulic fluid being supplied via the passage 7, with the consequent axial displacement of the sliding element 10 by actuation of the piston 6 and piston rod 8, at the same time a rotational movement of the pinion 4b and therefore of the pin 4a is induced, as a result of which the axial movement of the piston rod 8 is converted into a rotational movement of the pin and therefore of the folding-top linkage. It can be seen that sufficient space remains in a continuation of the sliding element 10 in order to displace the sliding element 10 to and fro without it emerging from the bearing plate 2. That opening of the hole 3 which lies opposite the stopper 11 can be closed by a further stopper, for example, in order to prevent dirt accumulation in the region of the hole 3. Instead of a direct connection to the pinion 4b, it is possible to provide a connection indirectly via an intermediate wheel or a gear, and it is furthermore possible to use the toothing 10a or a further toothing providing on another surface to cause a further pivotable and drivable unit of the folding top, for example the linkage of a folding-top compartment lid, to rotate.

It is obvious that springs or other prestressing means may be provided between the lid 11 and the piston 6 or between the piston 6 and the sliding element 10, in order to permit actuation even in the event of a hydraulic problem and in order to reduce the maximum pivoting moment of the folding top by the spring force.

The invention has been described above with reference to an exemplary embodiment having a hydraulic force-introducing unit. It is obvious that the force-introducing unit may also be based solely on the prestressing or relaxing of a spring, in particular if the folding top is actuated manually.

What is claimed is:

1. A main bearing unit for a convertible folding top, comprising
   a bearing plate having a hole,
   at least one kinematic pivot point of a folding-top linkage of the convertible folding top, which kinematic pivot point is mounted pivotably in the bearing plate,
   a linear force-introducing unit, and
   a pin which is assigned to the folding-top linkage,
   wherein the linear force-introducing unit, in order to actuate the folding-top linkage, is in driving connection with the pin assigned to the folding-top linkage,
   wherein the force-introducing unit is held in the hole in the bearing plate and is integrated in the bearing plate, and wherein the driving connection is provided in the kinematic pivot point.

2. The main bearing unit as claimed in claim 1, wherein the force-introducing unit comprises an axially displaceable shank which is in driving connection with the pin.

3. The main bearing unit as claimed in claim 1, wherein the driving connection of the pin and the force-introducing unit is enclosed by the bearing plate.

4. The main bearing unit as claimed in claim 1, wherein the force-introducing unit comprises a prestressable shank.

5. The main bearing unit as claimed in claim 1, wherein the force-introducing unit comprises a hydraulic piston-cylinder unit.

6. The main bearing unit as claimed in claim 5, wherein the cylinder is designed as a hole in the bearing plate.

7. The main bearing unit as claimed in claim 5, wherein the bearing plate has at least one connection for a hydraulic line.

8. The main bearing unit as claimed in claim 1, wherein the bearing plate is produced as an extruded profile.

9. The main bearing unit as claimed in claim 1, wherein the bearing plate is produced as a cast part.

10. The main bearing unit as claimed in claim 1, wherein the force-introducing unit is provided essentially parallel to the main direction of extent of the bearing plate.

11. A convertible vehicle, characterized by a main bearing unit for a convertible folding top, comprising a bearing plate having a hole, at least one kinematic pivot point of a folding-top linkage of the convertible folding top, which kinematic pivot point is mounted pivotably in the bearing plate, a linear force-introducing unit, and a pin which is assigned to the folding-top linkage, wherein the linear force-introducing unit, in order to actuate the folding-top linkage, is in driving connection with the pin assigned to the folding-top linkage, wherein the force-introducing unit is held in the hole in the bearing plate and is integrated in the bearing plate, and wherein the driving connection is provided in the kinematic pivot point.

12. A main bearing unit for a convertible folding top, comprising
    a bearing plate having a hole,
    at least one kinematic pivot point of a folding-top linkage of the convertible folding top, which kinematic pivot point is mounted pivotably in the bearing plate,
    a linear force-introducing unit comprising a prestressable shank, and
    a pin which is assigned to the folding-top linkage,
    wherein the linear force-introducing unit, in order to actuate the folding-top linkage, is in driving connection with the pin assigned to the folding-top linkage,
    wherein the force-introducing unit is held in the hole in the bearing plate and is integrated in the bearing plate.

13. A main bearing unit for a convertible folding top, comprising
    a bearing plate having a hole,
    at least one kinematic pivot point of a folding-top linkage of the convertible folding top, which kinematic pivot point is mounted pivotably in the bearing plate,
    a linear force-introducing unit comprising a hydraulic piston cylinder unit, and
    a pin which is assigned to the folding-top linkage,
    wherein the linear force-introducing unit, in order to actuate the folding-top linkage, is in driving connection with the pin assigned to the folding-top linkage,
    the hole in the bearing plate forming at least a part of a cylinder of the hydraulic piston cylinder unit,
    wherein the force-introducing unit is held in the hole in the bearing plate and is integrated in the bearing plate.

14. A main bearing unit for a convertible folding top, comprising
    a bearing plate having a hole and having at least one connection for a hydraulic line,
    at least one kinematic pivot point of a folding-top linkage of the convertible folding top, which kinematic pivot point is mounted pivotably in the bearing plate,
    a linear force-introducing unit comprising a hydraulic piston cylinder unit, and
    a pin which is assigned to the folding-top linkage,
    wherein the linear force-introducing unit, in order to actuate the folding-top linkage, is in driving connection with the pin assigned to the folding-top linkage,
    wherein the force-introducing unit is held in the hole in the bearing plate and is integrated in the bearing plate.

* * * * *